United States Patent [19]

Fernandez

[11] Patent Number: 5,489,830
[45] Date of Patent: Feb. 6, 1996

[54] CONTROL SYSTEM WITH LOADFEEL AND BACKDRIVE

[75] Inventor: Carlos P. Fernandez, Irvine, Calif.

[73] Assignee: McDonnell Douglas Corporation, Long Beach, Calif.

[21] Appl. No.: 303,421

[22] Filed: Sep. 9, 1994

[51] Int. Cl.⁶ .......................... B64C 13/18; G05B 11/01
[52] U.S. Cl. .................... 318/628; 318/584; 318/586
[58] Field of Search .................... 318/560–646; 244/17, 13, 181, 234, 195, 177, 194, 223, 178, 76 R, 194, 179, 2, 6, 221, 188, 76 C, 135 A, 87, 75 R, 228; 74/469, 471 XY, 862.05, 470

[56] References Cited

U.S. PATENT DOCUMENTS

| | | | |
|---|---|---|---|
| 4,095,763 | 6/1978 | Builta | 244/194 |
| 4,106,728 | 8/1978 | Griffith | 244/83 D |
| 4,150,803 | 4/1979 | Fernandez | 244/135 A |
| 4,236,685 | 12/1980 | Kissel | 244/223 |
| 4,313,165 | 1/1982 | Cleford et al. | 364/424 |
| 4,363,098 | 12/1982 | Buus et al. | 364/424 |
| 4,382,281 | 5/1983 | Fowler et al. | 364/424 |
| 4,420,808 | 12/1983 | Diamond et al. | 364/434 |
| 4,472,780 | 9/1984 | Chenoweth et al. | 364/434 |
| 4,500,967 | 2/1985 | Murphy et al. | 364/434 |
| 4,531,080 | 7/1985 | Nordstrom et al. | 318/628 |
| 4,563,743 | 1/1986 | Murphy et al. | 364/434 |
| 4,580,210 | 4/1986 | Nordstrom | 364/190 |
| 4,589,061 | 5/1986 | Nordstrom | 364/157 |
| 4,607,201 | 8/1986 | Koenig | 318/584 |
| 4,607,202 | 8/1986 | Koenig | 318/628 |
| 4,725,020 | 2/1988 | Whitener | 244/76 R |
| 4,762,294 | 8/1988 | Carl | 244/75 R |
| 4,765,568 | 8/1988 | Carl et al. | 244/75 R |
| 5,076,517 | 12/1991 | Ferranti et al. | 244/228 |
| 5,125,602 | 6/1992 | Vauvelle | 244/223 |
| 5,264,768 | 11/1993 | Gregory et al. | 318/561 |
| 5,291,113 | 3/1994 | Hegg et al. | 318/584 |
| 5,347,204 | 9/1994 | Gregory et al. | 318/632 |

Primary Examiner—Paul Ip
Attorney, Agent, or Firm—Donald E. Stout

[57] ABSTRACT

The control system includes a control member connected to a control centering device which resists operational control member movement and returns it to a neutral position upon release thereof. Force and position sensors connected to the control member determine operator force exerted thereon as well as the position thereof. Output from the sensors is transmitted to a computer which also receives data relating to position of aircraft controlled surfaces and aerodynamic forces acting on the aircraft as well as flight data, etc. The computer combines and compares that data with other data relating to frictional forces produced by movement of the mechanical control system and data relating to desired control member resistive forces under predetermined operational conditions. The computer thereby determines the magnitude of the control member resistive forces required to produce the desired tactile feel and provides an output based thereon to an actuator which applies these forces to the control member. When in automatic pilot mode, the computer provides an output to the actuator to move the control member to a position representing the command output that the computer provides to the controlled surfaces to control the position thereof.

18 Claims, 6 Drawing Sheets

CONTROL SYSTEM WITH LOADFEEL AND BACKDRIVE

BACKGROUND OF THE INVENTION

The invention relates generally to control systems which require loadfeel and/or backdrive and, in particular, to such systems requiring accuracy of the loadfeel breakout force and backdrive.

The value of providing tactile feedback to the controls of an aircraft have long been recognized, and many systems providing such tactile feel have been designed. Typically, it is desirable that the tactile feel or resistance forces applied to the controls be proportional to the G-forces resulting from operation of the controls. This provides improvement in handling characteristics of the aircraft and reduces the possibility of overstressing the aircraft during high speed maneuvers. In aircraft which also include automatic pilot systems, it is generally desirable to have a system which positions the controls in accordance with the positioning of the control surfaces of the aircraft i.e., a system which provides backdrive.

Some prior art manual control feel systems have been designed to be responsive to sensor inputs relating to the forces acting on the control surfaces. Examples of such prior art systems are disclosed in U.S. Pat. No. 4,236,685 to Kissel and U.K. Patent No. 2,061,843 to Smith. The Kissel system provides a manual control feel system in which the degree of feel provided is based on data pertaining to static pressure and other information from the controlled surfaces. The Smith system includes an hydraulic actuator which provides a feel force to the control lever in response to the aircraft position as well as in response to pitot and static pressure differential forces on the control surfaces. However, a primary disadvantage of such systems is that they do not provide data input pertaining to frictional forces of the control linkage and other mechanical subsystems. Since such forces may be of significant magnitude, their omission detracts from the precise feel such a control system would otherwise have. In addition, since such systems also do not include input pertaining to the pilot's manual forces exerted on the control lever, the tactile feedback such systems provide is not as precise or sensitive as may be desirable in some applications.

Many other prior art manual control systems for aircraft include one or more springs which resist movement of the control stick in all directions at all times during operation of the stick. An example of such a manual control system is disclosed in U.S. Pat. No. 4,477,043 to Repperger. The Repperger system includes a spring which is connected at its midpoint to the aircraft control stick and an actuator connected to opposite ends of the spring for compression thereof. The spring is utilized to resist movement of the stick from a neutral position. In response to information pertaining to movement of the aircraft, the actuators compress the spring thereby increasing its resistance to movement of the stick. However, as with the Smith system, the Repperger system does not provide continuous monitoring of the degree of manual force applied by the pilot to the stick at all times during operation thereof. Consequently, the precise feel provided by the Repperger system is compromised by this deficiency. Thus, the Repperger system has the disadvantage that it cannot be utilized in many aircraft applications because it is specifically designed for and thus limited to pure fly-by-wire systems in which there is no direct mechanical linkage between the pilot operated control member and the aircraft control surfaces.

Other prior art systems for providing feel to a manual control utilize a computer for determining the resistive forces applied to the control. An example of such a prior art system is disclosed in U.S. Pat. No. 4,516,063 to Kaye. The Kaye system utilizes a stepper motor connected to a computer to generate detents and feel forces resisting movement of the control member. The detent positions may be varied according to inputs relating to altitude of the aircraft, etc. However, as with the Repperger and Smith systems, there is no input to the computer regarding the forces applied by the operator to the manual control. Consequently, systems such as the Kaye system do not have a high degree of precision in control of the loadfeel.

Other control feel systems utilize a combination of devices to bias the control. An example of such a prior art system is disclosed in U.S. Pat. No. 4,580,210 to Nordstrom. The Nordstrom system utilizes inputs relating to current as well as previous positions of the control which are fed to a computer which provides a biasing force. The biasing force is directly provided by a spring and a torque motor. However, the Nordstrom system does not utilize any information inputs from the controlled motor or the aircraft outer surface structures (relating to aerodynamic forces acting thereon or flight conditions). Thus, not only does the Nordstrom system lack a sensor for determining the manual forces applied to the control but it also fails to utilize information regarding the controlled surface aerodynamic forces. Consequently, the Nordstrom system is not as sensitive or precise as may be desired in some applications.

The prior art manual control feel systems described hereinabove typically simply utilize the position of the manual control lever to determine the resistive force provided to the control lever. However, U.S. Pat. No. 5,076,517 to Ferranti discloses a system which also indirectly incorporates data relating to the manual forces applied to the control lever by utilizing an input relating to the force output of the control stick. The Ferranti system measures the force output of the control stick which is purportedly proportional to the degree of force exerted on the stick by the operator. Data relating to this control stick force is utilized to provide a signal to a motor to position the stick in response to that data. Although damping of the control stick is provided, application of resistive force to the stick is not provided in accordance with data relating to the pilot's manual forces applied to the stick. Consequently, this prior art system does not have a manual control stick force feedback loop utilized to provide a sensitive control stick feel based on desired parameters of aerodynamic forces on the controlled surfaces, flight conditions, etc.

What is thus needed is a control system having loadfeel and backdrive in which the loadfeel utilizes a control feedback loop to adjust the resistive forces applied to the control stick in response to the operator's forces exerted thereon. What is also needed is a control system with loadfeel and backdrive in which the system provides loadfeel by utilizing information relating to frictional forces acting on the mechanical back-up subsystem of the control system and/or frictional forces acting on the hydraulic and other mechanical components of a fly-by-wire control system.

SUMMARY OF THE INVENTION

It is a principal object of the present invention to provide a control system utilizing data relating to the operator's forces applied to the control to adjust loadfeel forces applied thereto.

It is also an object of the present invention to provide a control system having loadfeel utilizing multiple loadfeel subsystems acting concurrently on the control.

It is also an object of the present invention to provide a control system having backdrive.

It is an object of the present invention to provide a control system which reduces cockpit workload.

It is an object of the present invention to provide a control system utilizing data relating to frictional forces produced by movement of the control system mechanisms in response to actuation of the control to adjust the resistive forces applied to the control in order to provide loadfeel thereto.

It is also an object of the present invention to provide a control system in which the actuator providing operational movement of the controls also is utilized to apply resistive forces to the control in order to provide loadfeel thereto.

It is an object of the present invention to provide a control system which utilizes data relating to the controlled surface position and dynamic forces acting thereon to adjust the degree of loadfeel.

The control system of the present invention is specifically designed to provide a generally precise and sensitive loadfeel by utilizing a closed loop subsystem which incorporates sensor data pertaining to the operator's forces applied to the control member and to the resistive forces applied to the control member by the system. The control member of the system preferably includes both manual and pedal control members and may additionally include other types of operator control input structures as well. The system includes a control centering device which is connected to the control member and acts to automatically return it to a neutral position upon release of the control member or upon cessation of operational forces applied thereto. A force sensor is connected to the control member which senses the force applied to the control member by the operator. A position sensor is also connected to the control member to provide data output relating to the position of the control member. A computer processing unit receives data from the sensors and in combination with data from first and second databanks applies a desired degree of resistive force to the control member in order to provide the appropriate degree of loadfeel thereto. Optionally, aerodynamic force input may also be provided by computer calculation based on data of G-forces of the aircraft. The first databank includes data relating to frictional forces resisting movement of the control surfaces in response to operational movement of the control member. In systems having mechanical back-up, these frictional forces result from movement of the control cables and mechanisms connected to the controls as well as the load applied to the valves at the control surface actuators. In systems that are fully fly-by-wire and thus have no control cables, these frictional forces result from the movement of the mechanisms connected to the manual control members, mechanical loadfeels and backdrive actuators. The second databank includes data relating to the desired magnitude of the resistive forces applied to the control member under particular operating conditions. The data included in the second databank includes data pertaining to flight speed and other flight conditions, the aerodynamic capabilities of the aircraft, the stresses on the aircraft and controlled surfaces thereof under certain flight maneuvers, as well as the desired loadfeel provided to the control member under those flight conditions as well as combinations thereof. The system software combines the sensor data with the data in the databanks and determines the desired degree of resistive forces to be applied to the control member. The various data is compared both before and after the resistive force is applied to the control member thereby resulting in a closed loop subsystem; since application of the resistive force to the control member may affect the degree of force applied to the control member by the operator thereby altering sensor output, the repeated comparison of the sensor data may result in modification of the resistive forces applied to the control member.

The control s.ystem of the present invention is specifically designed for use in fly-by-wire systems which have a back-up mechanical control system as well as automatic pilot system. Additionally, however, the system of the present invention can also be used with pure fly-by-wire controls to increase the precision of the "feel" for the control systems and may also be used with mechanical and electronic control systems utilized in systems and vehicles other than aircraft. When the operator is utilizing the automatic pilot system, the control system of the present invention provides backdrive to the control member in order to enable the pilot to visually ascertain the effect the automatic pilot system is having on the control system.

Since the control system provides adjustments to the loadfeel of the control member during flight, the operator is more easily able to remain within the flight envelope of the aircraft by utilizing the tactile feedback provided to controls during aircraft maneuvers or other flight conditions. In this regard, the relatively sensitive and precise loadfeel provided to the control member by the system of the present invention enables the pilot to have better control over the aircraft and enables the pilot to more easily determine the flight envelope of the aircraft in relation to the entire flight regime of the aircraft. The system of the present invention obviates the shortcomings of prior art devices in producing an artificial loadfeel for flight controls due to their failure to incorporate parameters of frictional forces of the mechanical control mechanisms and cable runs used with the loadfeels. Consequently, by incorporating these parameters, the control system of the present invention provides the pilot with accurate tactile feedback necessary to determine the precise breakout force for the actuation of the controlled surfaces.

It is an important advantage of the system of the present invention that particular tactile feedback characteristics of the controls may be easily altered by suitable alterations to the data in the databank or changes to the software utilized in the computer processor unit. Thus, the control system of the present invention may easily accommodate different types of aircraft, different individual pilot requirements and different flight parameters by making suitable changes in the system.

It is also an important advantage of the system of the present invention that the improved tactile feedback provided by the control system improves aircraft efficiency, thereby enhancing the aircraft's fuel economy and reducing operating costs thereof in addition to reducing the pilot and copilot workload. In addition, the improved tactile feedback reduces the possibility of overstressing the aircraft during high-speed maneuvers.

DETAILED DESCRIPTION OF THE PREFERRED EMBODIMENT

The control system of the present invention is generally designated by the numeral 10. The control system 10 includes preferably a control means or control member 12 which may be simply a column/wheel, as commonly used in airliners, or a control lever (stick) commonly used with military aircraft, for example, fighter and attack aircraft. A control centering device or means 14 is preferably connected to the control member 12 and enables the control member 12 to revert to a generally neutral position upon release of the control member by the operator or by cessation of forces applied thereto in operation thereof. The control centering device 14 is preferably a doubleacting bungee or another type of suitable spring.

Figure 1:
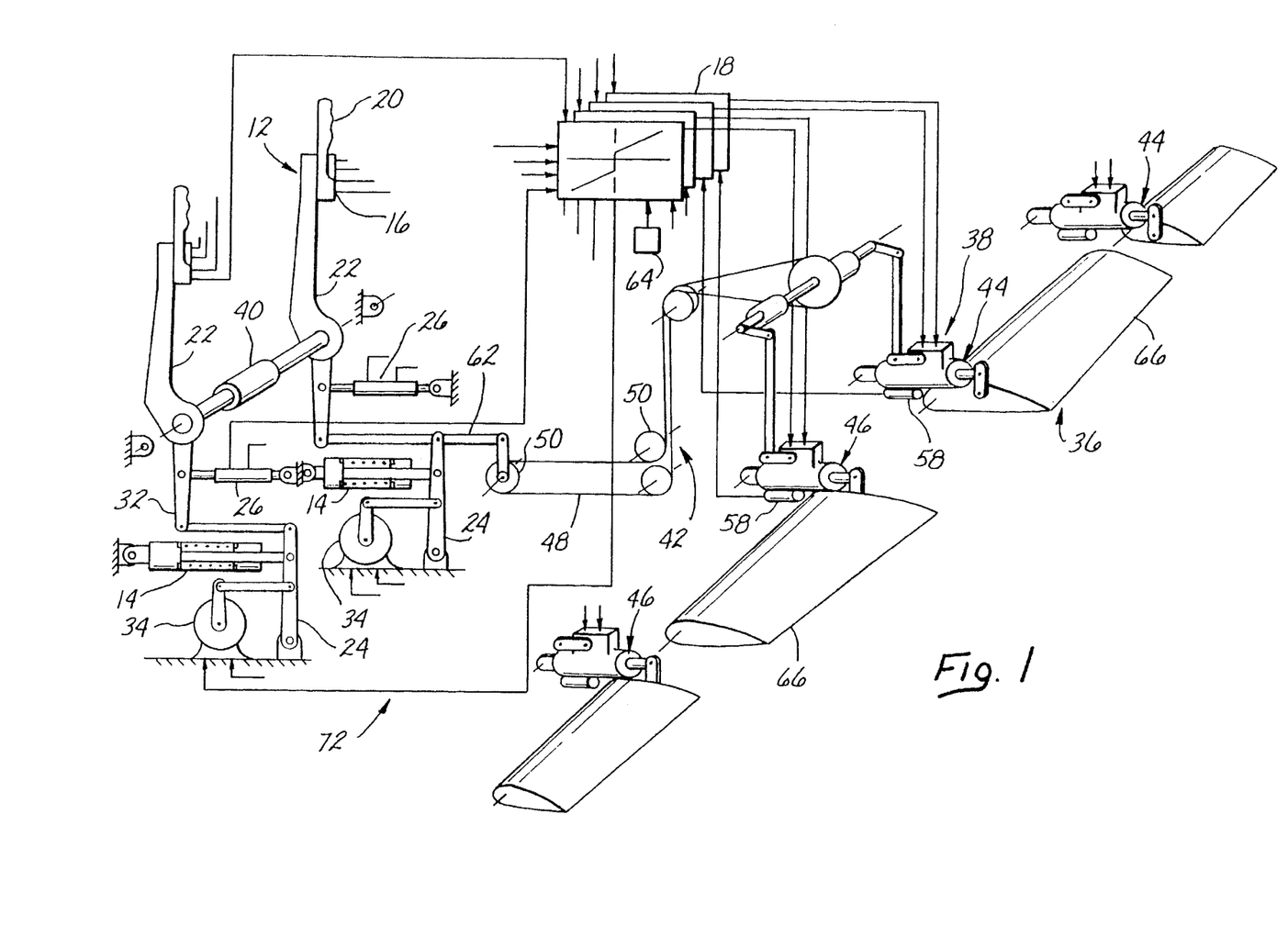
FIG. 1 is a diagrammatic view of the pitch control subsystem of the control system of the present invention as applied to an aircraft having both fly-by-wire controls and mechanical back up.
Figure 2:
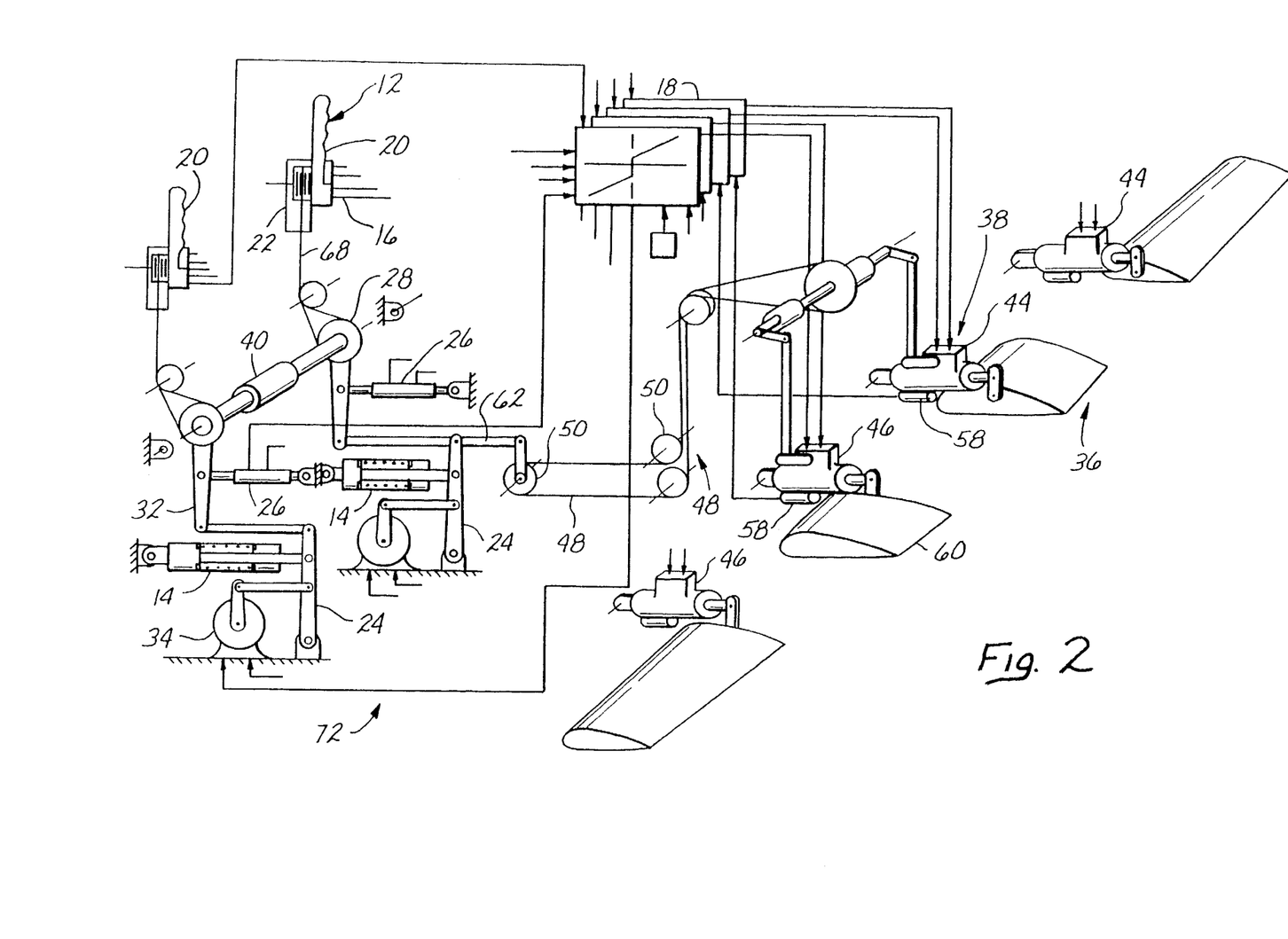
FIG. 2 is a diagrammatic view of the lateral control subsystem of the control system of the present invention as applied to an aircraft having both fly-by-wire controls and mechanical back up.
Figure 3:
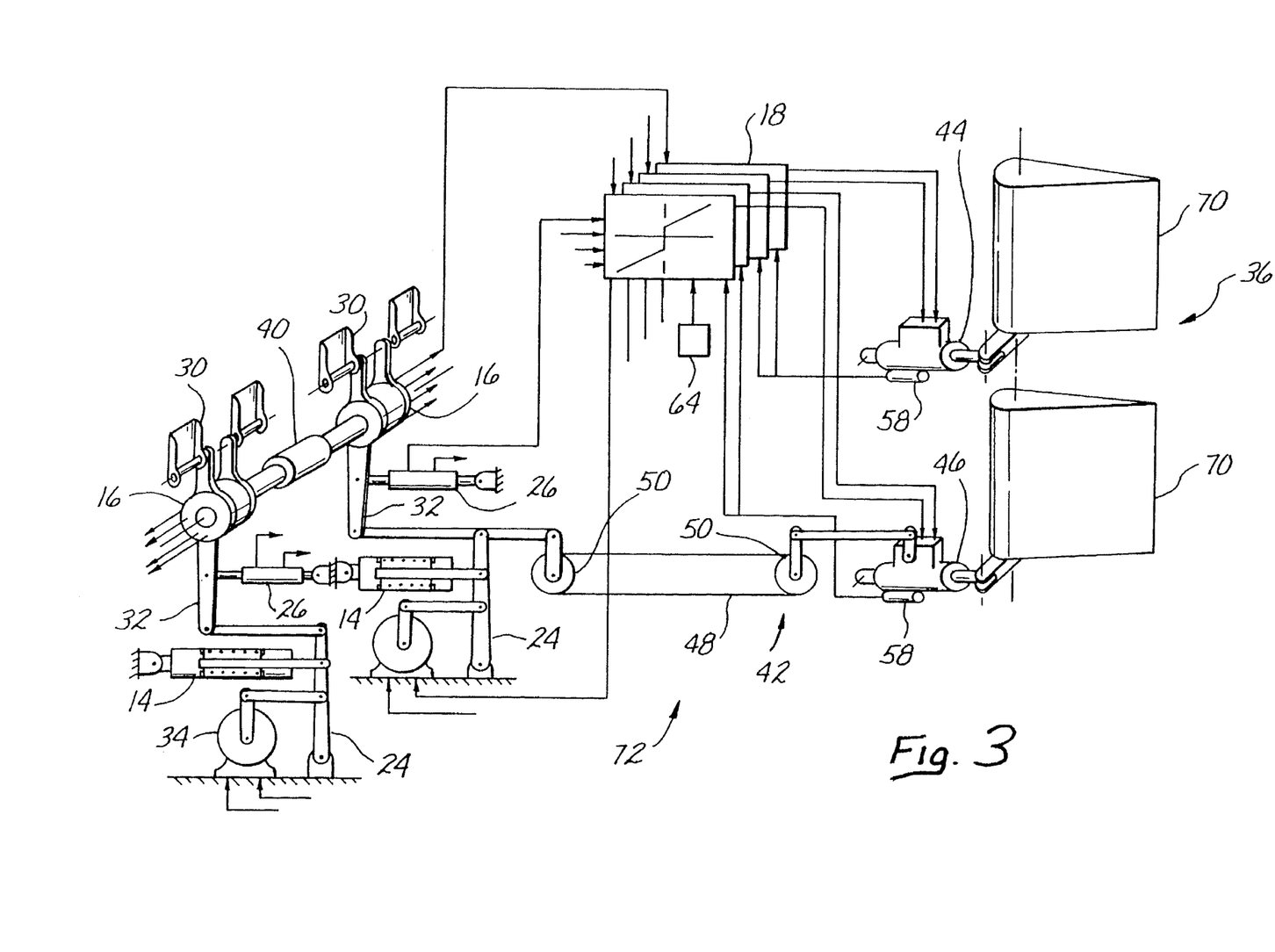
FIG. 3 is a diagrammatic view of the yaw control subsystem of the control system of the present invention as applied to an aircraft having both fly-by-wire controls and mechanical back up.

The control means or member 12 preferably includes a steering wheel 20, a column 22 and a pair of pedals 30. FIG. 1 shows the pitch or column control subsystem which controls the elevators 66 of the aircraft thereby providing pitch control capabilities to the control member 12. FIG. 2 shows the roll or steering wheel control subsystem which controls the ailerons 60 of the aircraft thereby providing roll control capabilities to the control member 12. FIG. 3 shows the yaw or pedal control subsystem which controls the rudders 70 of the aircraft thereby providing yaw control capabilities to the control member 12. The elevators 66, ailerons 60 and rudders 70 are generally designated as controlled structures or surfaces 36. Except for use of the same computer 18, the pitch, roll and yaw subsystems utilize separate component structures. However, these component structures have been assigned the same numbers because, except for the particular controlled surfaces, they are functionally and structurally essentially identical. Consequently, the numerical designations promotes a better understanding and clearer description of the control system 10 of the present invention.

As shown in FIG. 1, the member 12 preferably includes a column 22 rigidly connected to a crank 32 for control of the elevators 66. The crank 32 is connected to the leg 24 via interconnecting link 62. A force sensor 16 is preferably connected to the column 22 (at the steering wheel 20), and a position sensor 26 is preferably connected to the column 22 at the crank 32, as shown. The position sensor 26 has an output relating to the position of the member 12. The output from sensor 26 is preferably fed to the computer (or computer processor unit) 18 as is data from the force sensor 16. The position sensor 26 is preferably a position transducer and more preferably a linear variable differential transformer 26, although other suitable types of sensors such as a rotary variable differential transformer may also be utilized.

Figure 4:
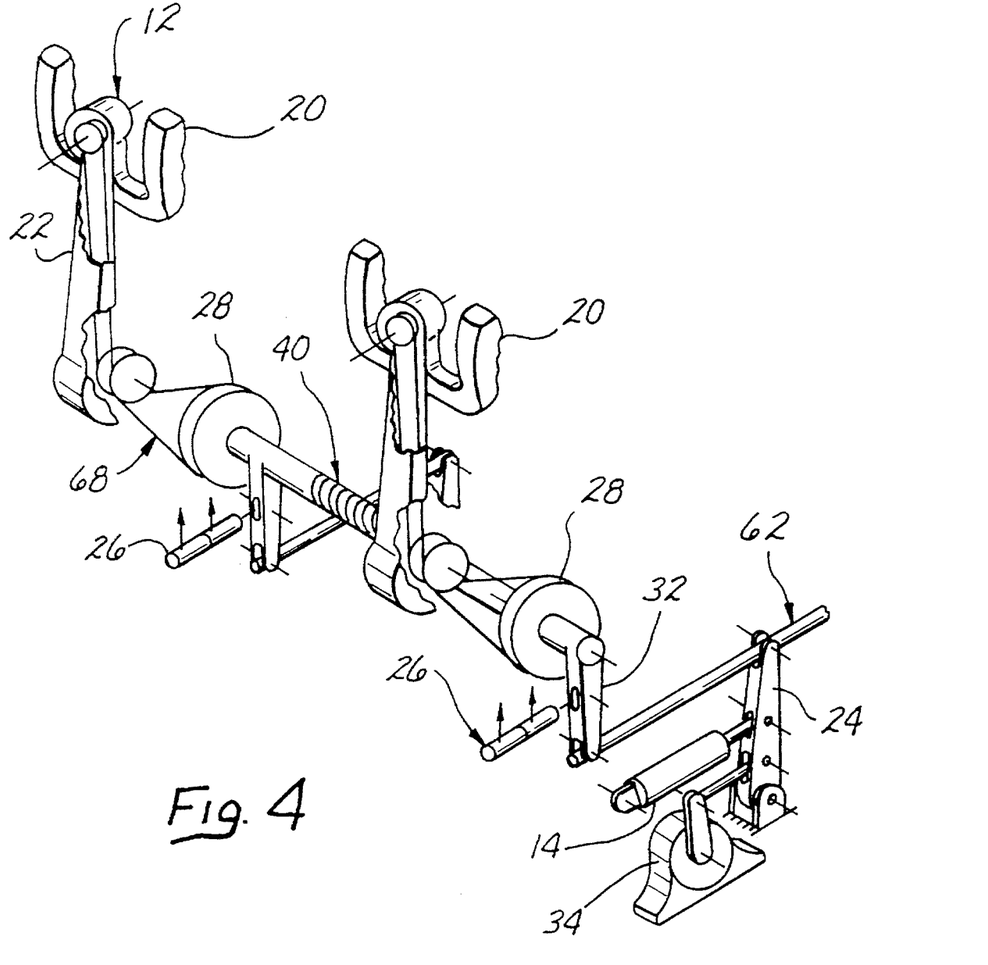
FIG. 4 is a detailed view of components of the manual control member and other components connected thereto of the lateral control subsystem shown in FIG. 2.

FIGS. 2 and 4 show the column portion 22 partially broken away in order to illustrate the control cables 68 of the steering wheel 20. The member 12 (more specifically, steering wheel 20) is preferably connected to a drum 28 via control cables 68. A force sensor 16 is preferably connected to the steering portion (or steering wheel) 20 and provides an output relating to the forces applied by the pilot to the member 12. A position sensor 26 is also connected to the control member 12 and provides position data output. As with the pitch control subsystem depicted in FIG. 1, the output of the sensors (preferably a plurality of sensors) 16 and 26 are preferably transmitted to a suitable computer processor unit 18. Control cables 68 connect the wheel 20 to the drum 28 and thereby to the crank 32 for control of the ailerons 60. Except as described, the remaining components of the roll control subsystem are essentially identical to the remaining components of the pitch control subsystem. The function of the computer processing unit 18, its connection to the other system components and the data it receives from the sensor 16 and 26 and from other sources will be described in detail hereinbelow.

As shown in FIG. 3, the control member 12 preferably includes a pedal structure or pedal (preferably a pair of pedals) 30 rigidly connected to the crank 32. A force sensor 16 is preferably connected to the pedals 30 and provides an output relating to the forces applied by the pilot to the member 12. The pedals 30 are connected to the upper and lower rudders 70 for control thereof via the cables 48, pulleys 50 and hydraulic actuators 44 and 46. Except as described, the remaining components of the yaw control subsystem are essentially identical to the remaining components of the pitch and roll control subsystems.

The control centering device 14 preferably also functions as a loadfeel structure or device and is preferably connected to the crank, as shown in FIGS. 1, 2, 3 and 4. The control centering device/loadfeel 14 preferably provides resistance to movement of the column 22, steering wheel 20 and pedals 30 in order to provide a tactile feel thereto. Although the loadfeel 14 is preferably a doubleacting bungee (compression spring), other suitable loadfeel structures may also be utilized. The loadfeel 14 is preferably connected to the member 12 by means of direct coupling to the crank 32.

A reversible control actuator 34 is also connected to the member 12 at the leg 24. The reversible control actuator 34 is provided to preferably back drive the member 12 for providing proper positioning of the member 12 when the aircraft is under automatic pilot in addition to applying a resistive force to the member 12 in order to provide the desired degree of tactile feel thereto when the aircraft is not under automatic pilot. Thus, resistive forces which may be either positive or negative i.e., cesisting or aiding movement of the control member 12, are applied to the control member 12 by the loadfeel 14 and reversible actuator 34 when the system is not in automatic pilot mode. Moreover, when in this normal mode, the loadfeel 14 and reversible actuator 34 are used only to alter the force i.e., torque, on the control member 12 and not to alter the position of the control member 12. In this regard, when the control system is in automatic pilot mode, the pilot is flying hands-off and the actuator 34 is not providing electrical loadfeel to the wheel 20 and/or the column 22 because it is not needed. In the automatic pilot mode, the actuator 34 solely provides backdrive to the wheel 20 and/or column 22. However, in certain automatic pilot modes, when the pilot grasps and moves the control member 12 thereby overriding the automatic pilot the automatic pilot disconnects and the control system reverts to normal mode with loadfeel. The loadfeel 14 is preferably a default rather than a back-up, i.e., it adds to the resistive forces applied by the control actuator 34 rather than substituting for these resistive forces and it is on all the time. This is preferable because as a back-up unit it would switch-over from resistive forces applied by the actuator to the resistive forces applied by the loadfeel, and such switch-over systems are not generally reliable. Consequently, both structures are designed to work concurrently.

Thus, in response to the pilot input via the steering wheel 20 and/or column 22 and/or pedals 30, the computer processor unit 18 provides an output to right and left (or upper and lower) hydraulic actuators 44 and 46, the control valves and other components of the hydraulic subsystem 38 which actuate the control surfaces 36.

The control member 12 is preferably a pair of control members 12, i.e., one for pilot and one for co-pilot with an override 40 therebetween. However, the control system 10 of the present invention is equally suitable for a single control member 12. However, for simplicity, the control system 10 has been described in conjunction with a single control member 12 and illustrated as such with regard to its connection to the controlled surfaces 36 in FIGS. 1,2,3,4 and 5.

Figure 5:
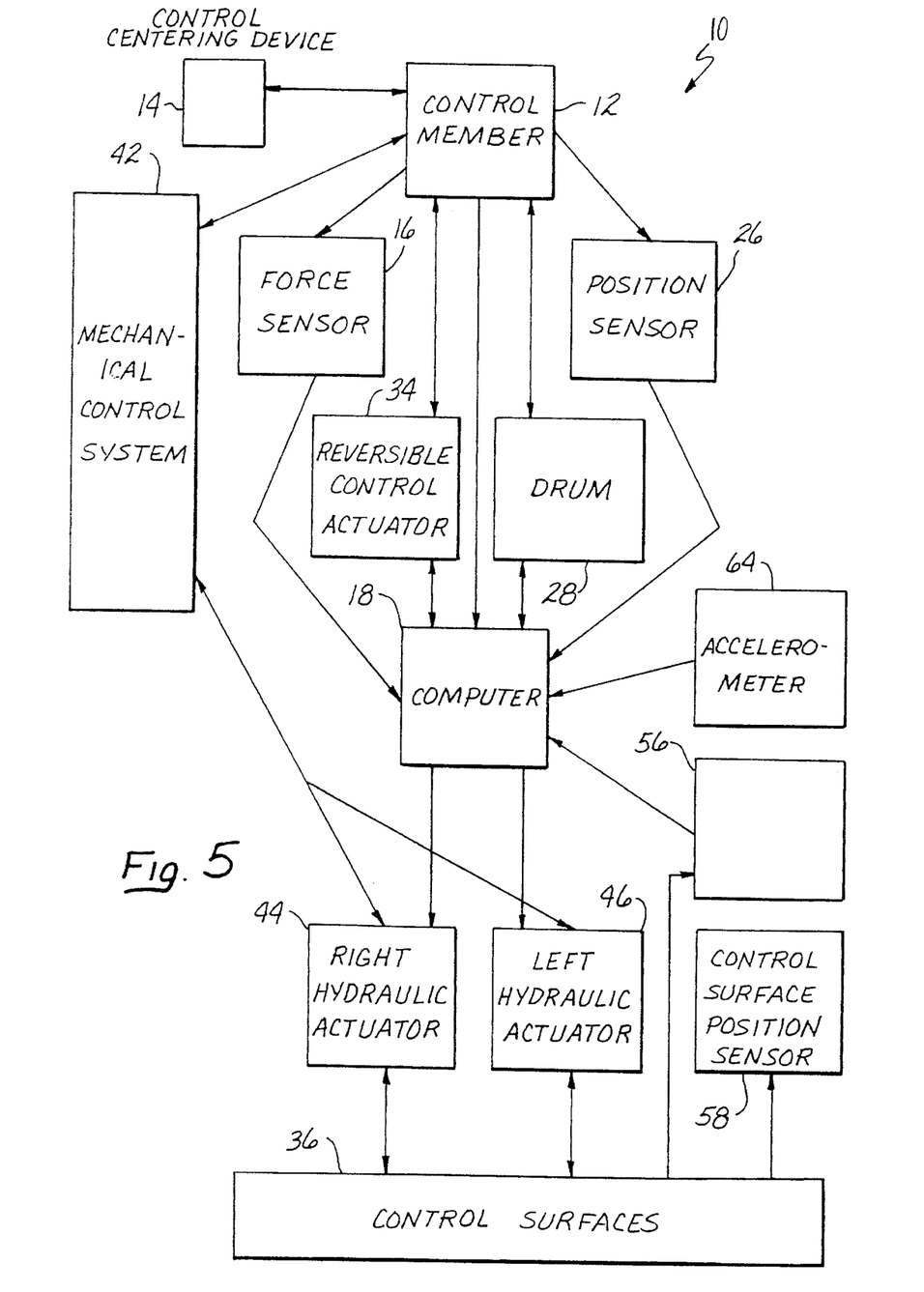
FIG. 5 is a block diagram of the control system of the present invention showing interconnections of its components.

The control member 12 is preferably connected to a mechanical control system 42 via the interconnecting link 62 (and also connected thereto via crank 32 and leg 24). The mechanical control subsystem 42 is preferably not connected to the outboard one of the right actuators 44 and the outboard one of the left actuators 46 (or the upper actuator 44 in the yaw subsystem). But, the mechanical control subsystem 42 is connected to the inboard one of the right actuators 44 and the inboard one of the left actuators 46 (or the lower actuator 46 in the yaw subsystem) and is preferably a back-up system which enables the pilot to control the control surfaces 36 by means of the mechanical control system 42. Since the mechanical control system 42 includes cables 48 and pulleys 50 as well as other mechanical structures which may produce a considerable amount of friction during operation of the mechanical control system 42, these frictional forces are important components of the resistive forces produced in response to manual operation of the control member 12. Consequently, these frictional resistive forces which result from operation of the manual control system 10 are determined and utilized to produce the desired degree of resistance to operation of the manual control system 10. Consequently, the frictional forces of the mechanical control subsystem 42 are included (as a model) in a first databank 52. Control surfaces position data from a control surface position sensor 58 mounted on the aircraft aileron 60, elevator 66 and rudder 70 is also fed directly to the CPU 18. In addition, the aerodynamic forces acting on the aircraft are determined by computer calculation based on G-forces of the aircraft 72 via an accelerometer 64 (which may be located at any suitable location on the aircraft 72) and the aerodynamic force data is also preferably fed directly to the CPU 18. A second databank 54 having data relating to the magnitude of the forces resisting operational movement of the member 12 under predetermined operational conditions is also utilized by the CPU 18 in determining the resistive forces to be applied to the control member 12 during operation thereof. Thus, the CPU 18 combines and compares data in the first and second databanks 52 and 54 with force data from the force sensor 16 and position data from the position sensor 26 to determine the degree of resistive force to be applied to the control member 12 via the reversible control actuators 34. Since under operational conditions, the CPU 18 may increase the resistive force applied to the control member 12 and thereby increase the force the pilot would apply to the member 12, the force sensor will, in response, produce an output containing data which, in effect, states that the force applied to the control member 12 by the pilot has increased and send this data to the CPU 18 for integrating this new data with the data in the databanks and the data from the other sensors. Thus, the force sensor 16, the control centering means/loadfeel 14, the reversible control actuator 34 and the CPU 18 comprise a feedback loop to both monitor and adjust the force applied to the control member 12 by these structures. The manual control system 10 thus provides a more accurate assessment of the precise point at which the breakout forces occur. This enables the pilot to more accurately be able to determine by tactile feedback the precise point in movement of the control member 12 at which the aircraft will respond thereby providing more precise control of the aircraft.

When the control surfaces 36 are being controlled by the automatic pilot system (not shown) of the aircraft, the reversible control actuator 34 backdrives the control member 12 to position the column portion 22 and/or steering wheel 20 and/or pedals 30 of the control member 12 so that they correspond to the position of the controlled surfaces 36, as per the command of the computer 18 to the controlled surfaces 36. This enables the pilot to visually determine the effect that the automatic pilot system is having on the controlled surfaces 36.

Figure 6:
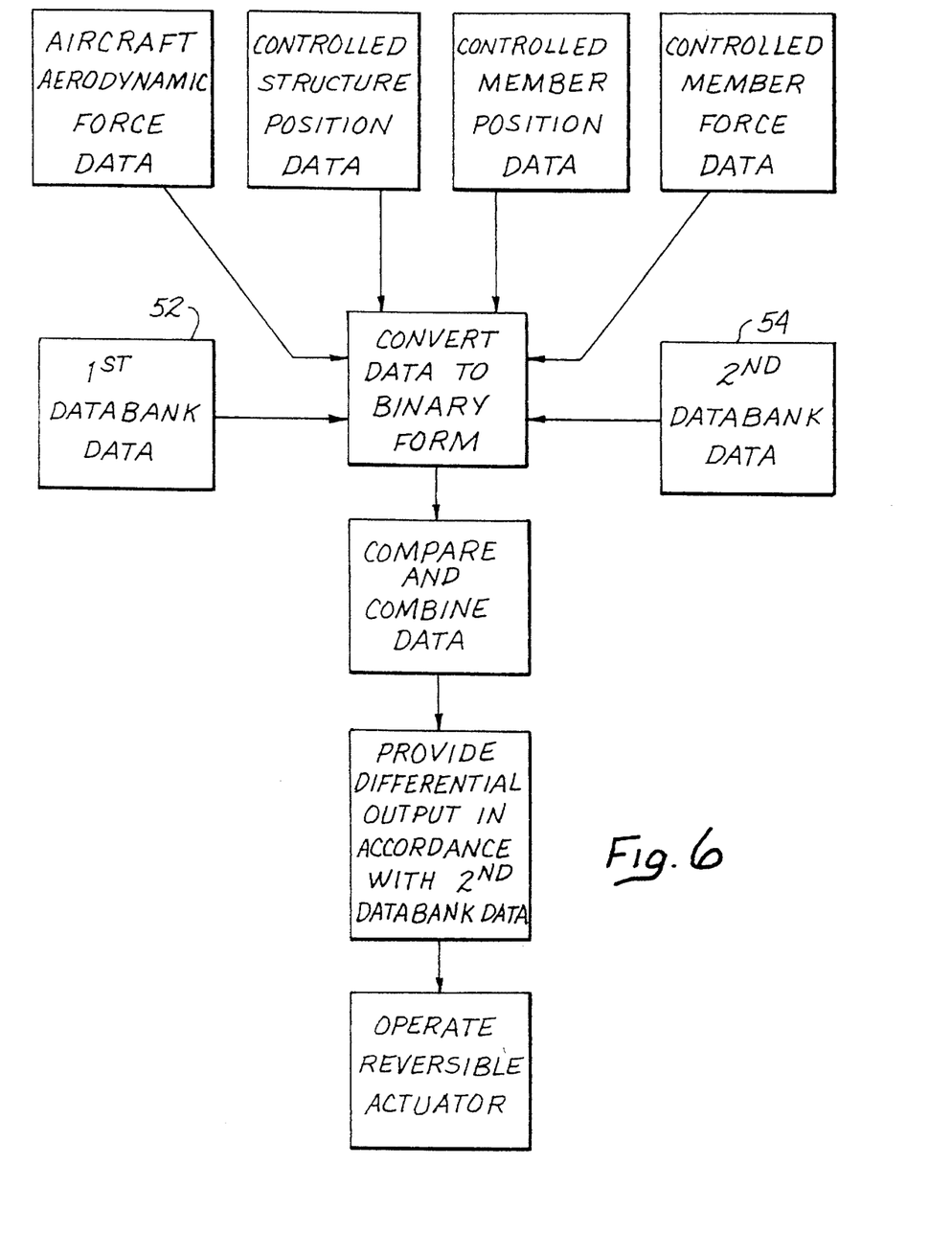
FIG. 6 is a flow chart of the software of the control system of the present invention.

FIG. 6 shows the flowchart for the software of the control system 10. The controlled structure position data, the aircraft aerodynamic force data, control member position data and control member force data are converted to binary code for use by the computer processor unit 18. These data are subsequently combined and compared with frictional force data from the first databank 52 and desired control member resistive force data from the second databank 54 in order to provide a differential output in accordance with second databank data. This yields a control signal output which is fed to the reversible control actuator 34 to, in response, either apply the desired resistive force to the control member, reduce the resistive force applied to the control member or not apply any resistive force to the control member 12 in accordance with the software commands and the desired resistive forces parameters of the data in the second databank.

Accordingly, there has been provided, in accordance with the invention, a control system with loadfeel and backdrive which provides the pilot with more sensitive and precise tactile feedback regarding the effect of operation of the control on the aircraft and on the controlled surfaces of the aircraft that fully satisfies the objective set forth above. It is to be understood that all the terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternatives, embodiments, modifications, and variations that fall within the spirit and scope of the invention as set forth in the claims hereinbelow.

What is claimed is:

1. A control system comprising:

a control member;

a control centering means connected to said member, said control centering means resisting operational movement of said member;

a control force sensor connected to said control member to sense operational forces applied to said member, said control force sensor having an output containing force data relating to the operational forces;

a control position sensor connected to said control member to sense the position of said control member, said control position sensor having an output containing position data relating to the position of the control member;

a control actuator electrically interconnecting said member and controlled structures for applying resistive forces to said member and operative forces to the structures;

a first databank having first data relating to frictional forces resisting operational movement of the controlled structures in response to operational movement of said member;

a second databank having second data relating to desired magnitude of forces resisting operational movement of said member under predetermined operational conditions; and a computer processor unit for receiving the data from said databanks and receiving information from said control force sensor and said position sensor and utilizing said data to control said actuator in order to provide a desired resistive force to said member.

2. The system of claim 1 wherein said first databank includes data relating to frictional forces of mechanical control subsystem connected to the controlled structures.

3. The system of claim 1 further including a controlled structure position sensor connected to said controlled structure for providing data to said computer processor unit relating to position of the controlled structures.

4. The system of claim 1 further including an accelerometer for providing data to said computer processor unit for determination of aerodynamic forces acting on aircraft controlled by the control system.

5. The system of claim 1 wherein said actuator positions said member in response to command signals of the computer processor unit data when the controlled structures are under automatic pilot operation.

6. The system of claim 1 wherein said control centering means positions said member in a generally neutral position in the absence of manual forces applied thereto when not in automatic pilot operation mode.

7. The system of claim 1 wherein said control centering means includes a double acting bungee.

8. The system of claim 1 wherein said control centering means includes a loadfeel structure connected to said member for applying resistive forces to said member.

9. The system of claim 8 wherein said loadfeel includes a double-acting bungee.

10. The system of claim 8 wherein the resistive forces applied by said loadfeel and said control actuator are selectively either positive or negative.

11. The system of claim 1 wherein said actuator fncludes a reversible actuator for selectively driving said member and the controlled structures in response to output from said computer processor unit.

12. The system of claim 1 wherein said control member includes a steering wheel.

13. The system of claim 1 wherein said control member includes a column.

14. The system of claim 1 wherein said control member includes a pair of pedals.

15. The system of claim 1 wherein said position sensor includes a linear variable differential transformer.

16. The system of claim 1 wherein said computer processor unit includes software for comparing the force data relating to the operational force applied to said control member with the second data from said second databank relating to the desired magnitude of the operational force applied to said member under predetermined operational conditions and for providing an output to said actuator to apply a desired resistive force to said member in order to produce the desired magnitude of forces resisting operational movement of said control member.

17. The system of claim 1 wherein said software compares the force data relating to the operational force applied to said control member with the first data from said first databank relating to the frictional resistive forces which result from operation of the control system and with the second data from said second databank relating to desired magnitude of the operational force applied to said member under predetermined operational conditions for providing an output to said control actuator to apply a resistive force to said member to produce the desired magnitude of forces resisting operational movement of said control member.

18. The system of claim 1 wherein the control actuator is reversible.

* * * * *